US009497768B2

(12) United States Patent
Jeng et al.

(10) Patent No.: US 9,497,768 B2
(45) Date of Patent: Nov. 15, 2016

(54) SYSTEM OF DYNAMICALLY ADJUSTING GENERATION FREQUENCY OF MESSAGES IN VEHICULAR NETWORKS AND METHOD THEREOF

(71) Applicant: Industrial Technology Research Institute, Hsinchu (TW)

(72) Inventors: An-Kai Jeng, Hsinchu (TW); Chia-Tai Tsai, Hsinchu (TW); Rong-Hong Jan, Hsinchu (TW); Chien Chen, Hsinchu (TW)

(73) Assignee: INDUSTRIAL TECHNOLOGY RESEARCH INSTITUTE, Chutung Township, Hsinchu County (TW)

( * ) Notice: Subject to any disclaimer, the term of this patent is extended or adjusted under 35 U.S.C. 154(b) by 104 days.

(21) Appl. No.: 14/339,217

(22) Filed: Jul. 23, 2014

(65) Prior Publication Data
US 2015/0117335 A1 Apr. 30, 2015

Related U.S. Application Data

(60) Provisional application No. 61/896,897, filed on Oct. 29, 2013.

(51) Int. Cl.
*H04W 4/00* (2009.01)
*H04W 72/10* (2009.01)
(Continued)

(52) U.S. Cl.
CPC ............ *H04W 72/10* (2013.01); *H04L 47/263* (2013.01); *H04L 67/12* (2013.01); *H04L 67/325* (2013.01); *H04W 4/046* (2013.01); *H04W 4/22* (2013.01); *H04W 84/12* (2013.01)

(58) Field of Classification Search
CPC ..... H04W 72/10; H04W 4/046; H04W 4/22; H04W 84/12

USPC ........................................................ 370/329
See application file for complete search history.

(56) References Cited

U.S. PATENT DOCUMENTS 7,924,728 B2    4/2011 Riga et al.
8,224,370 B2    7/2012 Miucic
(Continued)

FOREIGN PATENT DOCUMENTS

CN    102448180 A    5/2012
TW    201019657 A    5/2010
(Continued)

OTHER PUBLICATIONS

Lasowski, R. et al., "Beaconing as a service: a novel service-oriented beaconing strategy for vehicular ad hoc networks," IEEE Communications Magazine, vol. 50, No. 10, pp. 98-105, Oct. 2012.
(Continued)

*Primary Examiner* — Faisal Choudhury
(74) *Attorney, Agent, or Firm* — Muncy, Geissler, Olds & Lowe, P.C.

(57) ABSTRACT

A method of dynamic adjusting a generation frequency of messages in vehicular networks is provided, including: receiving updating requests and emergent degree of the vehicle event, and then determining whether the generation frequency of messages meets the dynamic change of the vehicle, if not satisfied, selecting a different adjustment method according to the event emergent degree. When the event is emergent, its generation frequency can be raised immediately by an interruptive adjustment and to suppress the generation frequency of messages of the others. Conversely, adjusting its generation frequency by a progressive adjustment and reducing the generation frequency of messages of the other lower-priority vehicles. According to the present disclosure, it prevents lower priority messages from occupying the channel overly, and emergency messages with higher priority can be satisfied immediately when it needed.

6 Claims, 12 Drawing Sheets

(51) Int. Cl.
*H04L 12/825* (2013.01)
*H04L 29/08* (2006.01)
*H04W 4/04* (2009.01)
*H04W 4/22* (2009.01)
*H04W 84/12* (2009.01)

(56) References Cited

U.S. PATENT DOCUMENTS

| | | | |
|---|---|---|---|
| 8,233,389 B2 | 7/2012 | Yim et al. | |
| 8,265,624 B2 | 9/2012 | Güner et al. | |
| 2004/0029558 A1* | 2/2004 | Liu | G01S 5/02 455/404.2 |
| 2009/0117860 A1* | 5/2009 | Kimura | H04B 1/1615 455/88 |
| 2010/0118741 A1* | 5/2010 | Youn | H04W 72/1242 370/259 |
| 2010/0312432 A1 | 12/2010 | Hamada et al. | |
| 2011/0055746 A1* | 3/2011 | Mantovani | B63C 11/26 715/771 |
| 2011/0140968 A1 | 6/2011 | Bai et al. | |

FOREIGN PATENT DOCUMENTS

| | | |
|---|---|---|
| WO | WO 2010/040372 A1 | 4/2010 |
| WO | WO 2011/038881 A1 | 4/2011 |
| WO | WO 2011/047708 A1 | 4/2011 |

OTHER PUBLICATIONS

Schmidt, R. et al., "Exploration Of Adaptive Beaconing for Efficient Intervehicle Safety Communication," IEEE Network, vol. 24, No. 1, pp. 14-19, Jan.-Feb. 2010.
Subramanian, S., et al. Congestion Control for Vehicular Safety: Synchronous and Asynchronous MAC Alforithms, *VANET 12 Proceedings of the ninth ACM international workshop on Vehicular inter-networking, systems, and applications*; Sep. 2012, pp. 1-10.
Kenney, J.B., et al. LIMERIC: A Linear Adaptive Message Rate Algorithm for DSRC Congestion Control, *Eighth ACM international workshop on Vehicular inter-networking (VANET)*; Mar. 2011; pp. 1-17; VTSI-2012-01516.R1.
Bilstrup, K.B., et al. Evaluation of the IEEE 802.11p MAC method for Vehicle-to-Vehicle Communication, *IEEE 68th Vehicular Technology Conference(VTC)*; Sep. 2008; pp. 1-5.
Chen, Q., et al., IEEE 1809.4 DSRC Mufti-Channel Operations and its Implications on Vehicle Safety Communications, *IEEE Vehicular Technology Conference(VTC)*, Dec. 2009; pp. 1-8.
ETSI TS 102 687, Intelligent Transport Systems (ITS); Decentralized Congestion Control Mechanisms for Intelligent Transport Systems operating in the 5 GHz range: Access layer part; *European Telecommunications Standards Institute (ETSI); ETSI ITS Standards*; Jul. 2011; pp. 1-45.
ETSI TS 102 724, Intelligent Transport Systems (ITS), Harmonized Channel Specifications for Intelligent Transport Systems operating in the 5 GHz frequency band; *European Telecommunications Standards Institute (ETSI); ETSI ITS Standards*; Oct. 2012; pp. 1-31.
Draft ETSI TS 102 636-4-2, Intelligent Transport Systems (ITS); Vehicular Communications; GeoNetworking; Part 4: Geographical addressing and forwarding for point-to-point and point-to-multipoint communications; Sub-part 2; Media-dependent functioneilties for ITS-G5; *European Telecommunications Standards Institute (ETSI): ETSI ITS Standards*; Oct. 2013: pp. 1-25.
Draft ETSI EN 302 637-3, Intelligent Transport Systems (ITS); Vehicular Communications; Basic Set of Applications; Part 3: Specifications of Decentralized Environmental Notification Basic Service; *European Telecommunications Standards Institute(ETSI)* ; ETSI ITS Standards; Oct. 2012; pp. 1-68.
ETSI TS 102 723-5, Intelligent Transport Systems (ITS); OSI cross-layer topics; Part 5: Interface between management entity and facilities layer; *European Telecommunications Standards Institute (ETSI); ETSI ITS Standards*; Nov. 2012; pp. 1-7.
Draft ETSI TS 102 723-11, Intelligent Transport Systems; OSI cross-layer topics, Part 11; Interface between networking & transport layer and facilities layer; *European Telecommunications Standards Institute (ETSI); ETSI ITS Standards*; May 2013; 1-9.
Huang, C-L., et al., Intervehicle Transmission Rate Control for Cooperative Active Safety System; *IEEE Trans. On Intelligent Transportation Systems*; vol. 12, No. 3, Sep. 2011; pp. 645-658.
Torrent-Moreno, M., et al., Vehicle-to-Vehicle Communication: Fair Transmit Power Control for Safety-Critical Information; IEEE Transactions on Vehicular Technology, vol. 58, No. 7, Sep. 2009, pp. 3684-3703.
TR 103 110, Structure of Decentralized Congestion Control; *European Telecommunications Standards Institute (ETSI); ETSI ITS Standards*; Oct. 2012; pp. 1-16.
Draft ETSI EN 302 637-2, Intelligent Transport Systems (ITS); Vehicular Communications; Basic Set of Applications; Part 2: Specification of Cooperative Awareness Basic Service; *European Telecommunications Standards Institute (ETSI); ETSI ITS Standards* ; Apr. 2013; pp. 1-42.
TS 103 141, Intelligent Transport System (ITS); Facilities Layer; Communication Congestion Control; *European Telecommunications Standards Institute (ETSI); ETSI ITS Standards*; Oct. 2013; pp. 1-13.
ETSI TS 102 894-1, Intelligent Transport Systems (ITS); Users & Applications requirements; Facility layer structure, functional requirements and specifications; *European Telecommunications Standards Institute (ETSI); ETSI ITS Standards*; Aug. 2013; pp. 1-56.

* cited by examiner

SYSTEM OF DYNAMICALLY ADJUSTING GENERATION FREQUENCY OF MESSAGES IN VEHICULAR NETWORKS AND METHOD THEREOF

CROSS-REFERENCE TO RELATED APPLICATIONS

This application claims the priority of a provisional application No. 61/896,897 filed on Oct. 29, 2013. The entire of the provisional application is hereby incorporated by reference herein and made a part of the specification.

TECHNICAL FIELD

The present disclosure relates to a system of dynamically adjusting a generation frequency of messages in vehicular networks and a method thereof.

BACKGROUND

In vehicular network environment, various applications achieve an interchange between vehicular states and events through periodic messages, such as road hazard signaling (RHS), intersection collision risk warning (ICRW), signal violation warning (SVW), transit signal priority (TSP), pre-crash warning (PCW), etc., which are common applications in vehicular network environment.

When the periodic messages of these applications are performed in the same environment, serious channel congestion problems may take place, thereby impacting the immediacy of important messages, especially for security messages. Regarding this issue, international associations such as European Telecommunications Standards Institute (ETSI)|$_{[Andy\ Jeng1]}$, begin to establish standards to set up a series of standards for decentralized congestion control (DCC). Current standards and techniques mainly consider the characteristics of mid-lower levels (network and transport level and access level) such as channel quality, without considering a facility level for the information provided by an application level. In other words, currently the minimum interval of messages being generated is determined based on channel load and message types (degree of priority), that is, to predetermine the transmission interval for various message types, degree of priority thereof, and various messages in different conditions. In practice, appropriate transmission intervals can be selected as the generation frequency of messages based on current channel load degree. Although this approach prevents low-priority messages from overly occupying the channel, emergency message frequency is inevitably limited. Accordingly, it is not ensured that the required generation frequency of the emergency messages with high priority is met. Therefore, the emergency messages with high priority are not immediately transmitted, and the latency reduces the driver's reaction time, which even causes danger.

Thus, there is still room of improvement for the generation frequency of messages, especially for preventing low-priority messages from overly occupying channels while satisfying the generation frequency of emergency messages with high priority.

SUMMARY

The present disclosure proposes a system of dynamically adjusting a generation frequency of messages in vehicular networks arranged in a carrier and a method thereof. Different adjustment methods of reacting time can be selected based on update need and emergent degree of a carrier event, so as to adjust a generation frequency of periodic messages.

The present disclosure provides a system of dynamically adjusting a generation frequency of messages in vehicular networks arranged in a carrier, comprising: a message receiving module that receives a message priority and a minimum update frequency of messages from an application and an event indication generated by the carrier when moving dynamically; a need determination module that determines whether a generation frequency of messages of the carrier meets the minimum update frequency and generates a frequency adjustment instruction when the generation frequency does not meet the minimum update frequency; an emergency determination module that determines whether the event indication is an emergent event after receiving the frequency adjustment instruction, and generates an interruptive adjustment instruction when the event indication is determined to be the emergent event, or a progressive adjustment instruction when the event indication is determined to be not the emergent event; and an adjustment module that adjusts the generation frequency based on the interruptive adjustment instruction or the progressive adjustment instruction.

The present disclosure further provides a method of dynamically adjusting a generation frequency of messages in vehicular networks, comprising: receiving a message priority and a minimum update frequency of messages from an application and an event indication generated by a carrier when moving dynamically that uses the messages from the application; determining whether a generation frequency of messages of the carrier meets the minimum update frequency, and generating a frequency adjustment instruction when the generation frequency does not meet the minimum update frequency; determining whether the event indication is an emergent event after receiving the frequency adjustment instruction, and generating an interruptive adjustment instruction when the event indication is determined to be an emergent event, or a progressive adjustment instruction when the event indication is determined to be not the emergent event; and executing the interruptive adjustment instruction or the progressive adjustment instruction to adjust the generation frequency.

DETAILED DESCRIPTION

Figure 1:
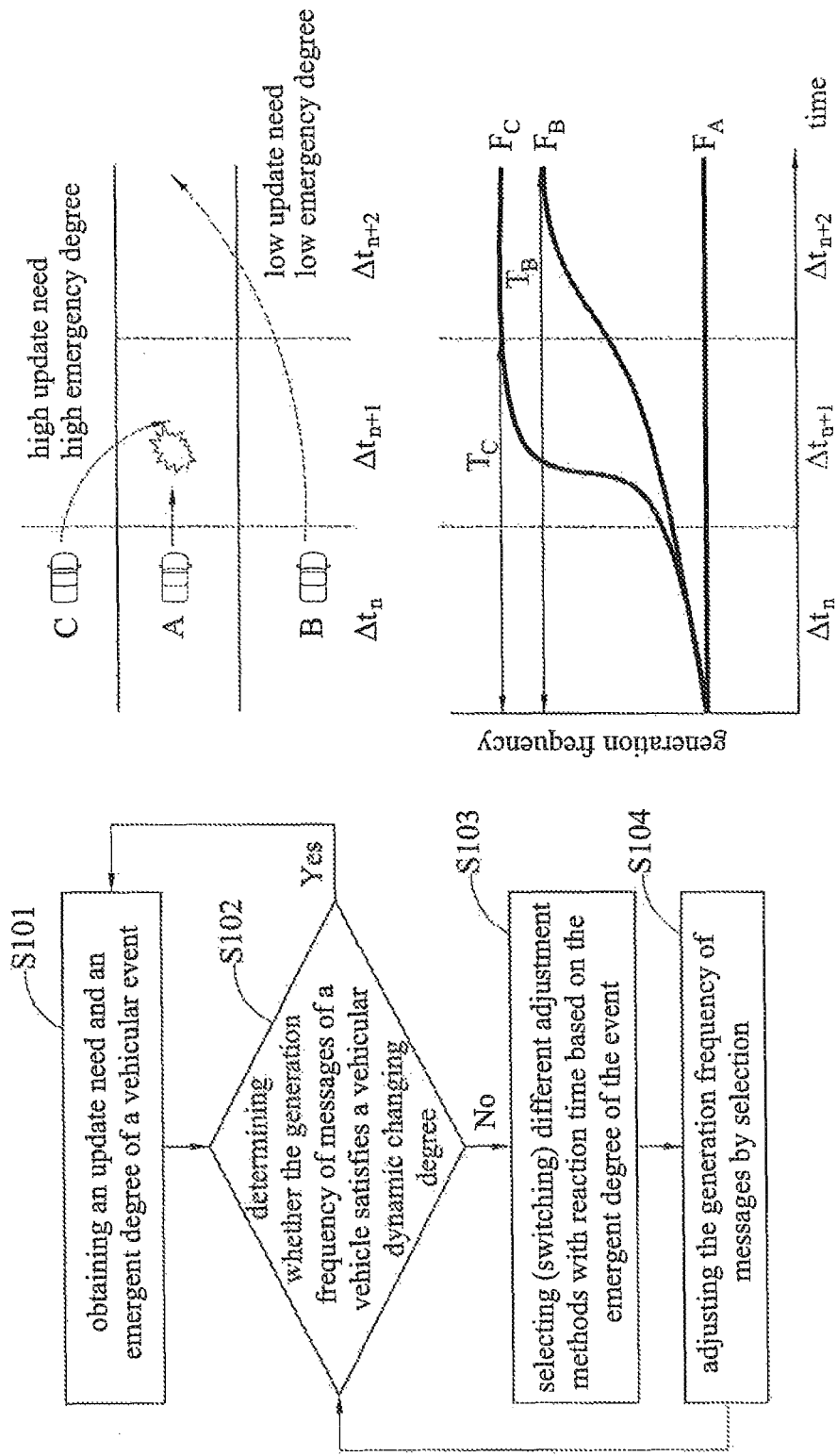
FIG. 1 illustrates dynamically adjusting a generation frequency of messages in vehicular networks according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 illustrates dynamically adjusting a generation frequency of messages in vehicular networks according to the present disclosure.

Step S101 describes obtaining an update need and an emergent degree of a vehicular event. The present disclosure differs from the conventional determination method in that the present disclosure further considers the emergent degree. Therefore, a generation frequency of messages of an emergency event with high priority may immediately meet a required frequency.

Step S102 describes determining whether the generation frequency of messages of a vehicle satisfies a vehicular dynamic changing degree. Step 102 describes that the vehicle may raise a message update need during the occurrence of the event, and if the generation frequency of messages thereof cannot satisfy the vehicular dynamic changing degree, the generation frequency of messages has to be adjusted.

Step S103 describes selecting (switching) different adjustment methods with reaction time based on the emergent degree of the event. For instance, if the event is emergent, the generation frequency of messages has to be immediately adjusted to meet a required threshold. On the contrary, if the event is not emergent, the generation frequency of messages can be progressively adjusted to meet the required threshold.

Step S104 describes adjusting the generation frequency of messages by selection, that is, adjusting the generation frequency of messages based on the selected adjustment method in step S103.

In one scenario as shown in the upper right portion of FIG. 1, both vehicle B and vehicle C change to the lane of vehicle A. Since vehicle C changes the lane with a shorter time compared with vehicle B, vehicle C has a higher update need and a higher emergent degree than those of vehicle B. Therefore, an adjustment time for the generation frequency of messages of vehicle C should be shorter.

As shown in the bottom right portion of FIG. 1, the changes of generation frequencies of vehicles A, B and C are explained. As illustrated, an event occurs at time $\Delta t_{n+1}$. Since vehicle C has the higher update need and the higher emergent degree, vehicle C has a greater generation frequency and finally both vehicles B and C reach to required frequencies $F_B$ and $F_C$ satisfying the dynamic changes thereof, respectively. However, due to the different adjustment methods caused by different emergent degrees, vehicle B consumes time $T_B$ and vehicle C consumes time $T_C$ to reach their required frequencies.

Figure 2:
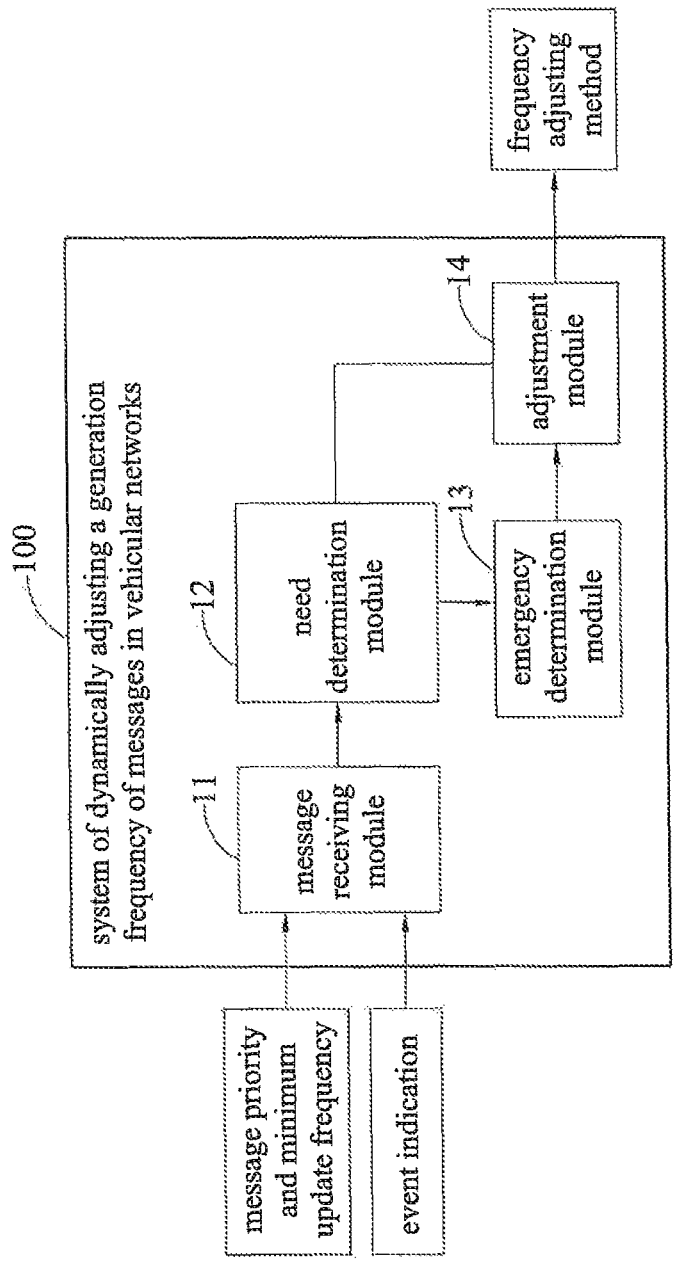
FIG. 2 illustrates a system of dynamically adjusting a generation frequency of messages in vehicular networks according to the present disclosure.

FIG. 2 illustrates a system 100 of dynamically adjusting a generation frequency of messages in vehicular networks according to the present disclosure. The system 100 may be arranged in a carrier for adjusting a generation frequency of messages of the carrier based on a dynamic change of the carrier. The system 100 comprises a message receiving module 11, a need determination module 12, an emergency determination module 13, and an adjustment module 14.

The message receiving module 11 receives a message priority and a minimum update frequency of messages from the application and an event indication when the carrier moves dynamically. The message receiving module 11 receives application requests, for example, what messages to be transmitted, message priority and minimum update frequency thereof (i.e., interval of sending the message), and the like from a higher level. This can be utilized to subsequently determine the priority degree and adjust the frequency. In addition, the message receiving module 11 further receives the event indication when the carrier moves dynamically. For example, both collision prediction and light warning are events that may occur anytime during the movement of the carrier. Therefore, the generation frequency of messages may have to be changed (when the requirement cannot be satisfied) when the events occur.

The need determination module 12 determines the generation frequency of messages of the carrier, and generates a frequency adjustment instruction when the generation frequency of messages of the carrier does not satisfy the minimum update frequency. In other words, the need determination module 12 determines whether the generation frequency of messages of the carrier meets the generation frequency of messages in response to the dynamical change of the carrier. If the generation frequency of messages of the carrier fails to respond to the changed event indication such as the emergent event, the frequency adjustment instruction is generated.

The emergency determination module 13 determines whether the event indication is an emergent event after receiving the frequency adjustment instruction, and generates an interruptive adjustment instruction when the event indication is determined to be the emergent event, or a progressive adjustment instruction when the event indication is determined to be not the emergent event. Therefore, the emergent determination module 13 further determines whether the event is emergent only when the generation frequency of messages cannot respond to the changed event indication, and based on that the event indication is determined to be or to be not the emergent event, the interruptive adjustment instruction or the progressive adjustment instruction is generated.

The progressive adjustment instruction is used to reduce generation frequencies of messages of other carriers and detect a channel load of a message transmission channel in the carrier, so as to adjust the generation frequency of messages of the carrier based on the channel load. When the event indication is not the emergent event, it is not necessary to immediately change the generation frequency of messages, thereby the progressive adjustment is applicable to perform the adjustment. In particular, the progressive adjustment method reduces the generation frequencies of messages of another carriers and increases the generation frequency of messages of the carrier while the message transmission channel of the carrier has enough capacity, so as to respond to the generation frequency of messages in the non-emergent event. Moreover, reducing the generation frequencies of messages of another carrier is based on determining the message priority degrees of the two messages, such that the message priority of the reduced message must be lower than that of the carrier.

In addition, the interruptive adjustment instruction is utilized to adjust the generation frequency of messages of the carrier to be no lower than the minimum update frequency, and reduce the generation frequencies of messages of another carries by transmitting one or more set channel access parameters based on the message priority degree. When the event indication is the emergent event, which means the generation frequency of messages should be immediately changed, the interruptive adjustment method is applied to perform the adjustment. Specifically, the interruptive adjustment method directly and immediately increases the generation frequency of messages of the carrier to be greater than the required update frequency, so as to satisfy the need of the emergent event. Meanwhile, the message is forced to transmit to reduce the generation frequencies of messages of another carriers by the channel access parameter(s) preset based on the message priority degree. The channel access parameter(s) are determined in advance based on the message priority degree, such that the message with higher message priority is presented by the parameters. Therefore, the carrier can be forced to transmit the signal of the message with higher message priority and reduce the transmission of another carriers, that is, other carriers reduce the generation frequency of messages based on the channel condition thereof.

The adjustment module 14 adjusts the generation frequency of messages of the carrier based on the interruptive adjustment instruction or the progressive adjustment instruction generated by the emergency determination module 13.

If the need determination module 12 determines that the generation frequency of messages of the carrier satisfies the minimum update frequency, a preset adjustment instruction is generated and is also transmitted to the adjustment module 14, so as to adjust the generation frequency of messages of the carrier. If the progressive adjustment is applied, the adjustment process may not meet the requirement at once, and thus it is necessary to repeatedly determine whether the need is being satisfied. Therefore, the adjustment module 14 transmits the adjustment content back to the need determination module 12, and uses the need determination module 12 to determine whether the adjustment should continue.

It should be appreciated that the preset adjustment instruction adjusts the generation frequency of messages based on a threshold currently set up. As different application messages have different priorities, a corresponding generation frequency of messages can be obtained by looking up a table based on the relationships such as the priority degree of the application message and the channel load, for example, the message with higher priority gains weights, the distance of message transmission is elongated if the channel load is high, and the corresponding table is built according to aforesaid rules.

Figure 3:
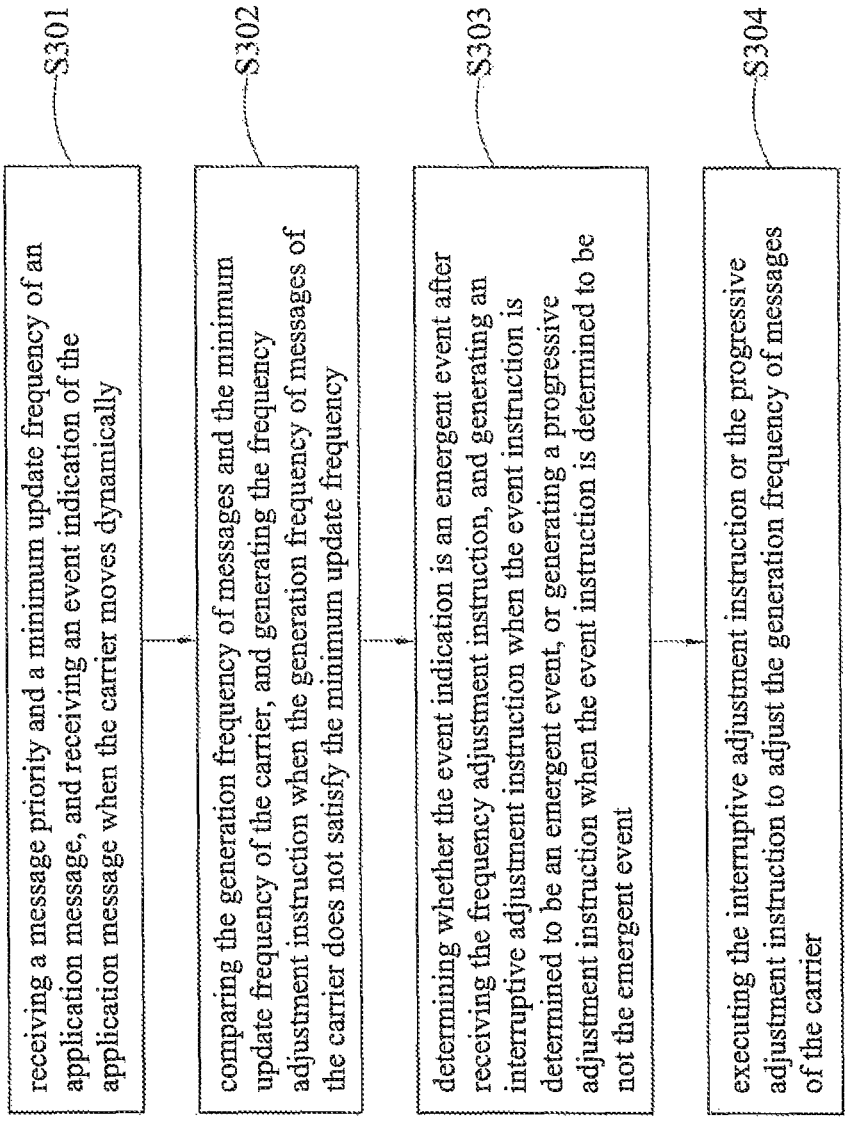
FIG. 3 is a flow chart of a method of dynamically adjusting a generation frequency of messages in vehicular networks according to the present disclosure.

FIG. 3 is a flow chart of a method of dynamically adjusting a generation frequency of messages in vehicular networks according to the present disclosure. Step S301 includes receiving the message priority and the minimum update frequency of the messages, and receiving the event indication of the messages when the carrier moves dynamically. Step S301 explains that a system in the carrier obtains the message priority of the messages and the minimum update frequency thereof, such that a need to adjust the generation frequency of messages can be determined when the event occurs. In addition, the event indication generated due to the dynamic change when the carrier moves can be utilized to analyze an event category and determine whether the event is emergent.

Step S302 includes comparing the generation frequency of messages with the minimum update frequency of the carrier, and generating the frequency adjustment instruction when the generation frequency of messages of the carrier does not satisfy the minimum update frequency. Step S302 determines whether the generation frequency of messages of the carrier satisfies the minimum update frequency. If the minimum update frequency is not satisfied, which means that an adjustment needs to be performed, the frequency adjustment instruction is generated. If the minimum update frequency is satisfied, which means the present generation frequency of messages conforms to the dynamic change of the carrier, the preset adjustment instruction is generated to change the frequency by the preset adjustment method.

As mentioned previously, the preset adjustment instruction means the threshold of the current generation frequency of messages, which builds the corresponding table based on the priority degree and channel load of the application message. Afterward, if the preset adjustment instruction is selected, the corresponding generation frequency of messages can be obtained by looking up the table.

Step S303 includes determining whether the event indication is an emergent event after receiving the frequency adjustment instruction, and generating an interruptive adjustment instruction when the event instruction is determined to be an emergent event, or generating a progressive adjustment instruction when the event instruction is determined to be not the emergent event. Step S303 further determines whether the event indication is an emergent event when the generation frequency of messages of the carrier needs to be adjusted. If the event indication is an emergent event, the interruptive adjustment instruction is generated to perform subsequent processes, or the progressive adjustment instruction is generated to perform subsequent processes.

Step S304 includes executing the interruptive adjustment instruction or the progressive adjustment instruction to adjust the generation frequency of messages of the carrier. The progressive adjustment instruction reduces the generation frequencies of messages of another carrier and increases the generation frequency of messages of the carrier when the message transmission channel of the carrier has the capacity, so as to respond to the frequency adjustment of the non-emergent event. The generation frequencies of messages of another carrier are reduced due to the message priorities thereof are lower.

The interruptive adjustment instruction immediately and directly increases the generation frequency of messages of the carrier to be greater than the required update frequency, so as to satisfy the need of the emergent event. Simultaneously, the interruptive adjustment instruction forces the message to be transmitted and reduces the generation frequency of messages of other carriers by the channel access parameter(s) preset based on the message priority degree.

Figure 4:
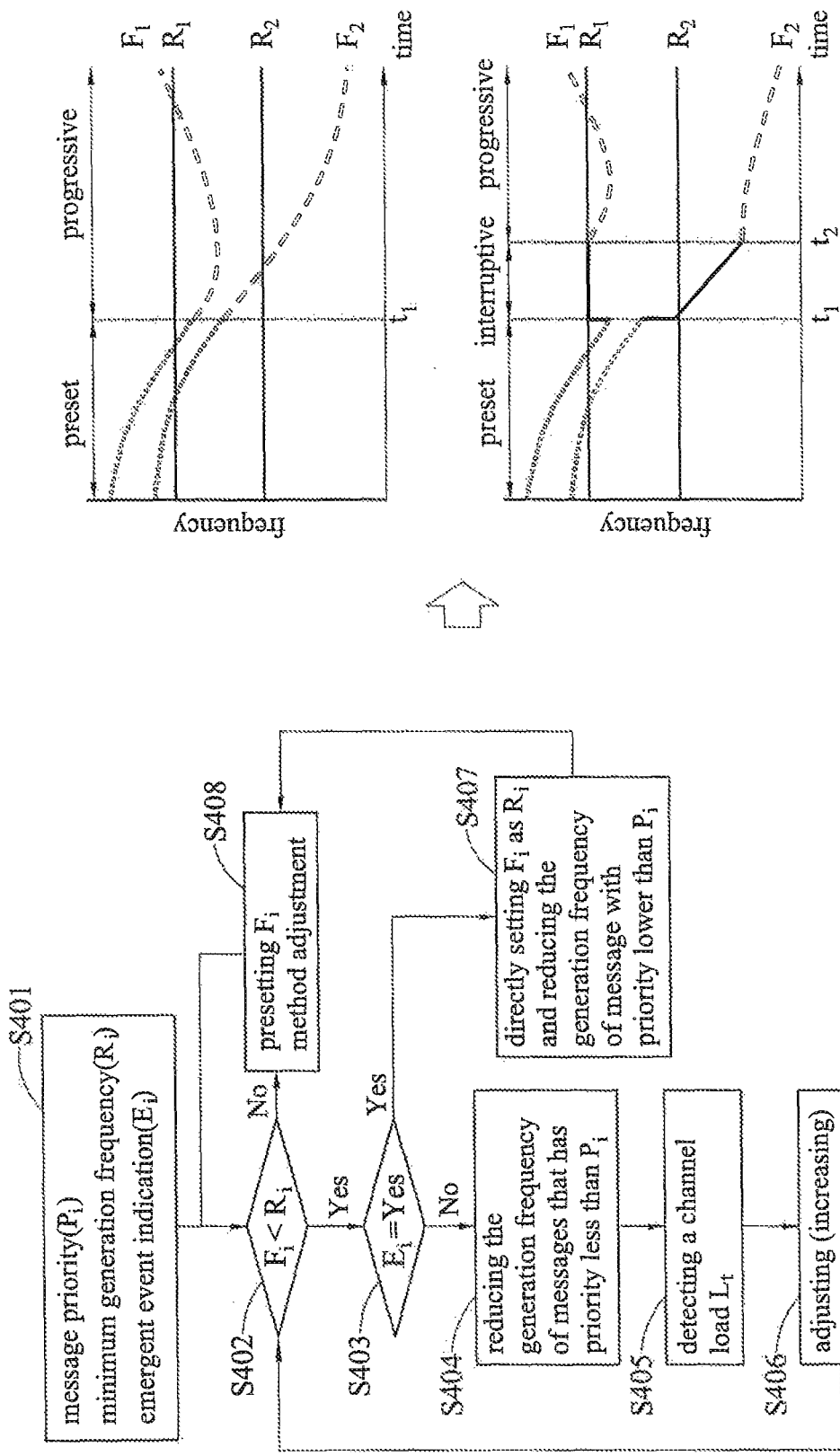
FIG. 4 illustrates an implementation process of a method of dynamically adjusting a generation frequency of messages in vehicular networks according to the present disclosure.

FIG. 4 illustrates an implementation process of a method of dynamically adjusting a generation frequency of messages in vehicular networks according to the present disclosure. Step S401 includes obtaining a message priority ($P_i$), a minimum generation frequency ($R_i$) and an emergent event indication ($E_i$). Step S402 includes determining whether the generation frequency of messages $F_i$ of a first carrier satisfies (greater than or equal to) the required frequency $R_i$. If the required frequency $R_i$ is not satisfied, step S403 is proceeded.

Step S403 includes determining whether the emergent event indication is an emergent event. If the emergent event indication is determined to be not an emergent event, steps S404 to step S406 can be performed to reduce the generation frequency of messages of message with priority lower than $P_i$ (other carriers, such as a second carrier). The step S403 includes detecting the channel load $L_f$ of the carrier, and then adjusting (increasing) the generation frequency of messages $F_i$ based on $L_f$.

In step S403, if the emergent event indication is determined to be an emergent event, the adjustment is performed by step S407. Step S407 includes directly setting $F_i$ as $R_i$ and reducing the generation frequency of message with priority lower than $P_i$. After a period of time, for example, a period of time after the generation frequency of messages is satisfied or the emergent event indication becomes a non-emergent event, step S408 is proceeded to adjust the frequency by the manner of the preset $F_i$.

In step S402, if the generation frequency of messages $F_i$ of the first carrier is determined to satisfy (to be greater than) the needed frequency $R_i$ step S408 is proceeded to adjust the frequency by the manner of the preset $F_i$.

As shown in the curve diagram in the upper right portion of FIG. 4, the frequency $F_1$ of the first carrier does not satisfy the requirement $R_i$ after time $t_1$, but this does not belong to an emergent event such that the progressive adjustment method can be applied to adjust the frequency $F_i$ to $R_i$ or above $R_i$. At time $t_1$, since the message priority of the second carrier is less than that of the first carrier, the frequency $F_2$ of the second carrier will be progressively adjusted (reduced).

As shown in the curve diagram in the bottom right portion of FIG. 4, the frequency $F_1$ of the first carrier does not satisfy the requirement $R_1$ after time $t_1$, but this belongs to an emergent event such that the interruptive adjustment method is applied to directly increase the frequency $F_1$ to satisfy $R_1$. The frequency $F_2$ of the second carrier is forced to decrease, after a period of time when the first carrier completes the event, and the adjustment method is switched back to the progressive adjustment method.

When it is more emergent, for example, shorter safety distance, incoming collision, or closer to a traffic light, it may be necessary to use the interruptive adjustment method to conform the generation frequency of messages to the required frequency in the dynamic change. On the contrary, if there is no need to adjust, the generation frequency of messages is adjusted based on the preset adjustment method, or if it is necessary to adjust but not emergent, the progressive adjustment method is used to conform the generation frequency of messages to the required frequency in the dynamic change.

Figure 5A:
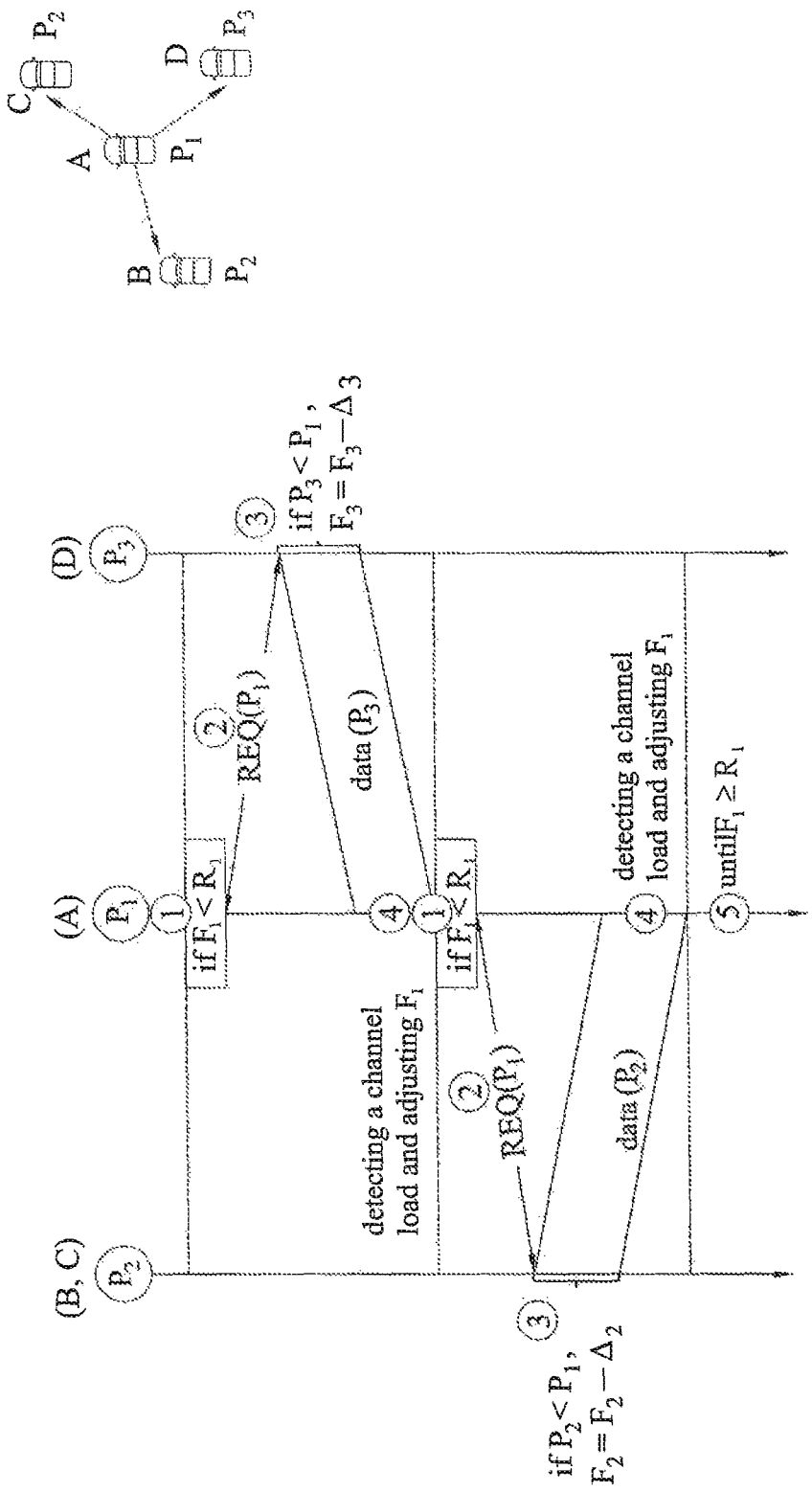
FIGS. 5A and 5B illustrate a system of dynamically adjusting a generation frequency of messages in vehicular networks with respect to a progressive adjustment method according to the present disclosure.
Figure 5B:
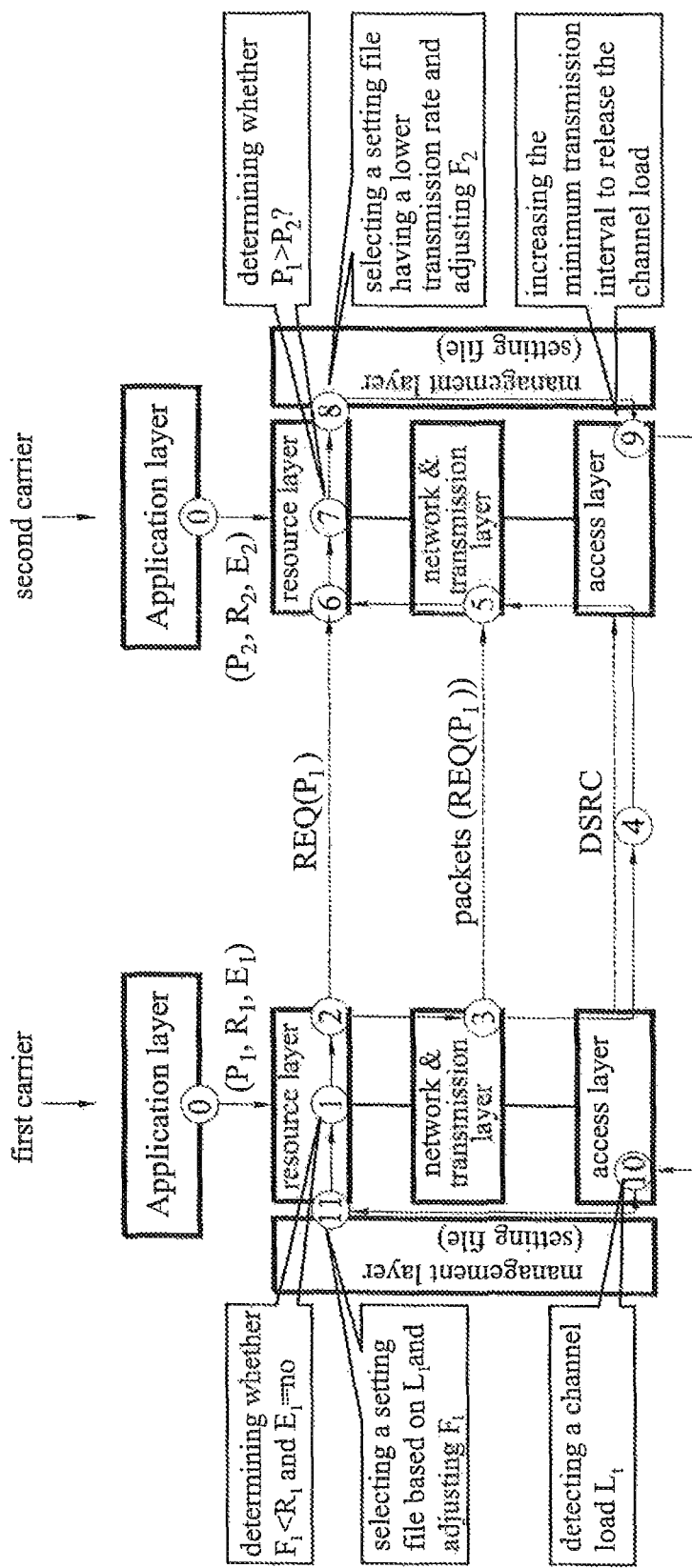

FIGS. 5A and 5B illustrate a system of dynamically adjusting a generation frequency of messages in vehicular networks with respect to a progressive adjustment method according to the present disclosure. Processes of the progressive adjustment method are explained, including a vehicle A with priority $P_i$, vehicles B and C with priorities $P_2$, vehicle D with priority $P_3$, and $P_1 > P_2 > P_3$.

Process 1 includes determining whether the current generation frequency of messages $F_1$ (or the generation frequency of messages after a period of time) satisfies the required frequency $R_1$.

Processes 2 and 3 show that when the process 1 determines that $F_1$ cannot satisfy $R_1$, it is requested to reduce one or more nearby generation frequency of messages with priority lower than $P_1$. As shown, the vehicle A sends a request (including the priority $P_1$ thereof) to the nearby vehicle D. A system of the vehicle D determines that the priority thereof is less than that of the vehicle A, and reduces a generation frequency of messages $F_3$ by itself, for example, by a constant (or variable) frequency value $\Delta_3$, and transmits a response (including the priority $P_3$ thereof) to the vehicle A.

In process 4, after the vehicle D reduces the generation frequency of messages thereof, the vehicle A adjusts the generation frequency of messages $F_1$ based on the channel load thereof currently detected (or detected after a period of time), until the generation frequency of messages $F_1$ satisfies (greater than) the required frequency $R_1$, as shown in process 5.

Similarly, procedures of abovementioned processes 1-5 are also performed between the vehicle A and vehicles B and C. It should be noted that FIG. 5A does not specify the order to process vehicle A and vehicles B, C and D. In other words, once vehicles in the message transmission range of the vehicle A (with the highest priority) receive the request, all vehicles reduce the generation frequencies of messages thereof; or the lower-priority vehicles may reduce the generation frequencies of messages thereof, such that the vehicle A satisfies the need. Therefore, various applications can be designed based on the need.

As shown in FIG. 5B, processes of the progressive adjustment method in respective agreement levels according to European Union ITS standard are explained. Respective network transmission levels of the first carrier are at the left, and that of the second carrier are at the right. An application level of the first carrier generates and transmits $P_1$, $R_1$ and $E_1$, to a resource level of the first carrier. Similarly, the second carrier also transmits $P_2$, $R_2$ and $E_2$ to its resource level.

When the event occurs (processes 1-4), upon $F_1$ is confirmed as smaller than (not satisfying) $R_1$ and $E_1$, and the event is not emergent, a request REQ($P_1$) is transmitted to the second carrier. In other words, an actual data is transmitted to the second carrier through the output of a network and transmission level and an access level of the first carrier. Next, as shown in processes 5-9, the actual data is transmitted to a resource level of the second carrier through a receipt of an access level and a handle of a network and transmission level of the second carrier. At this time, if $P_1$ being larger than $P_2$ is confirmed, the second carrier adjusts its $F_2$ with a setting of lower transmission rate, so as to attempt to enlarge its minimum transmission interval to release the channel load and inform the first carrier.

In processes 10-11, the first carrier detects a channel load $L_f$, so as to determine whether there is room to increase the generation frequency of messages, that is, if the second carrier reduces its generation frequency of messages, the channel load of the first carrier can be reduced. Therefore, when there is room, $F_1$ is adjusted by selecting a setting based on $L_f$ in the resource level of the first carrier, such that the generation frequency of messages of the first carrier is satisfied.

Figure 6A:
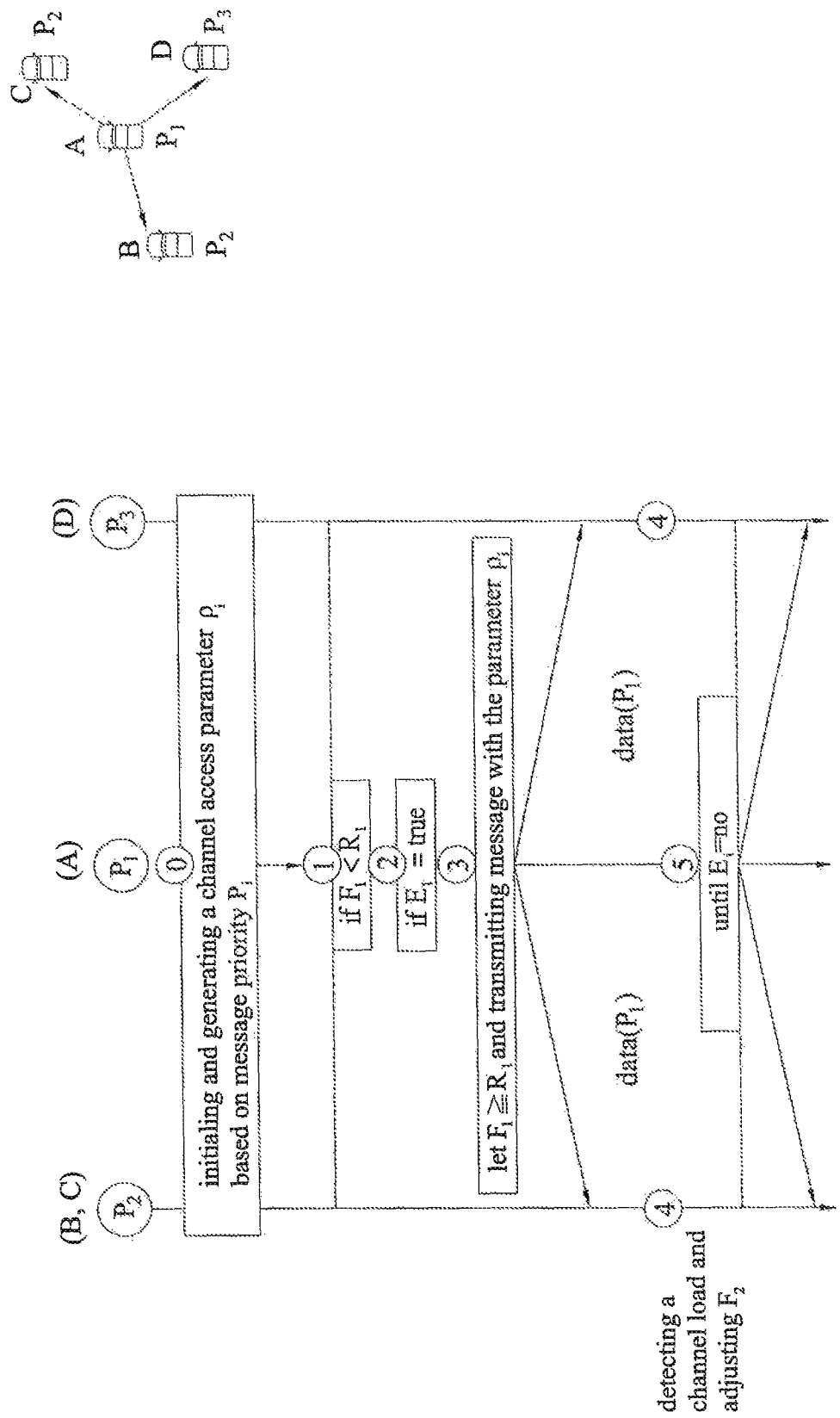
FIGS. 6A and 6B illustrate a system of dynamically adjusting a generation frequency of messages in vehicular networks with respect to an interruptive adjustment method according to the present disclosure.
Figure 6B:
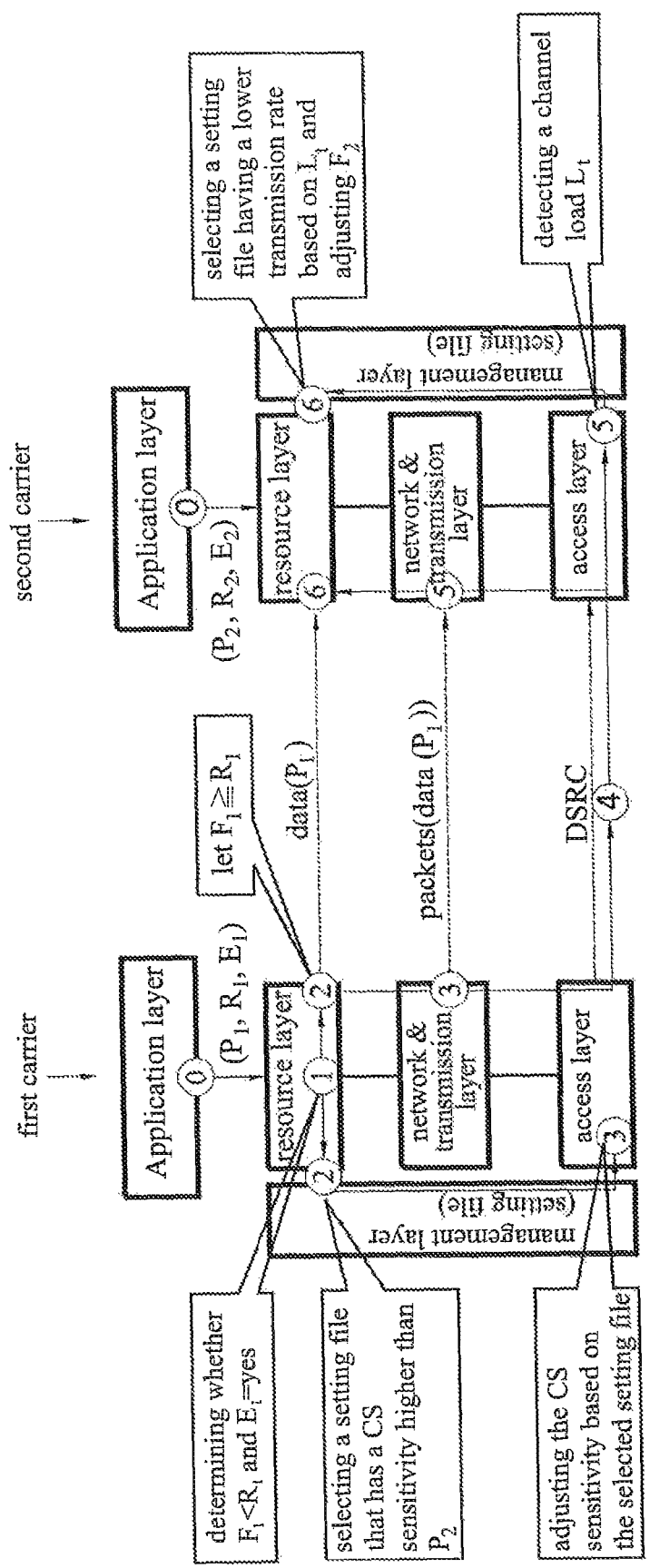

FIGS. 6A and 6B illustrate a system of dynamically adjusting generation frequency of messages in vehicular networks with respect to an interruptive adjustment method according to the present disclosure. As shown in FIG. 6A, processes of the interruptive adjustment method are explained, including a vehicle A with priority $P_1$, vehicles B and C with priorities $P_2$, vehicle D with priority $P_3$, and $P_1>P_2>P_3$.

Process 0 includes initializing to determine a channel access parameter $\rho_i$ based on a priority $P_i$ that is, setting the channel access parameter $\rho_i$ such that the message with high priority has a greater channel accessing ability.

Process 1 includes determining whether the current generation frequency of messages $F_1$ (or the generation frequency of messages after a period of time) satisfies the required frequency $R_1$. Process 2 includes determining an emergency message, for example, determining whether $E_i$ is an emergent event.

Process 3 includes directly adjusting $F_1$ to be no less than the required frequency $R_1$ when process 2 determines an emergent event, and utilizing the corresponding channel access parameter $\rho_i$ to transmit messages.

In process 4, vehicles B, C and D cannot further transmit messages upon receiving aforesaid channel access parameter $\rho_i$ (the parameter has determined the priority degree). The vehicles B, C and D adjust generation frequencies $F_2$, $F_3$ and $F_4$ with lower message priorities $P_2$, $P_2$ and $P_3$ based on the detected channel load.

Process 4 includes maintaining the generation frequencies (in response to the actual level parameters) for a period of time, and adjusting the generation frequencies based on above processes until the emergent event disappears, that is, $E_1$ being determined to be not an emergent event.

As shown in FIG. 6B, processes of the interruptive adjustment method in respective agreement levels according to European Union ITS standard are explained. Respective network transmission levels of the first carrier are at the left, and that of the second carrier are at the right. First, an application level of the first carrier generates and transmits $P_1$, $R_1$ and $E_1$ to a resource level of the first carrier. Similarly, the second carrier also transmits $P_2$, $R_2$ and $E_2$ to its resource level.

When the event occurs (processes 1-3), F1 is directly increased to be larger than or equal to R1 (i.e., let $F_1$ satisfy $R_1$) upon $F_1$ is confirmed as being smaller than (not satisfying) $R_1$ and $E_1$ is confirmed as an emergent event. In addition, a management level (including a setting) of the first carrier finds a setting with carry sense (CS) sensitivity higher than $P_2$, so as to adjust the CS sensitivity based on the setting, which is independently executed on the end of the first carrier and is not affected by the second carrier.

In processes 2-4, when $F_1$ is creased to be larger than or equal to $R_1$ as mentioned above (let $F_1$ satisfy $R_1$), the resource level of the first carrier also ends a data ($P_1$) to the second carrier, that is, an actual data is transmitted to the second carrier through the output of a network and transmission level and an access level of the first carrier.

In processes 5-6, once the second carrier receives the data transmitted from the first carrier, a channel load $L_t$ of the second carrier is detected, and $F_2$ is adjusted by selecting a setting with lower transmission rate based on $L_t$ in the resource level of the second carrier.

In other words, in an emergent event, the interruptive adjustment method is applied, so the first carrier directly increases its $F_1$ to be larger than or equal to $R_1$ (let $F_1$ satisfy $R_1$), and simultaneously transmits the data (preset parameters of the carrier) to force the second carrier to reduce its generation frequency of messages based on the channel load thereof. Therefore, communication between the first and second carriers is reduced due to the end of the first carrier has to increase the generation frequency of messages thereof in response to an emergent event and ignore the situation of the second carrier, i.e., force the second carrier to cooperate.

Figure 7:
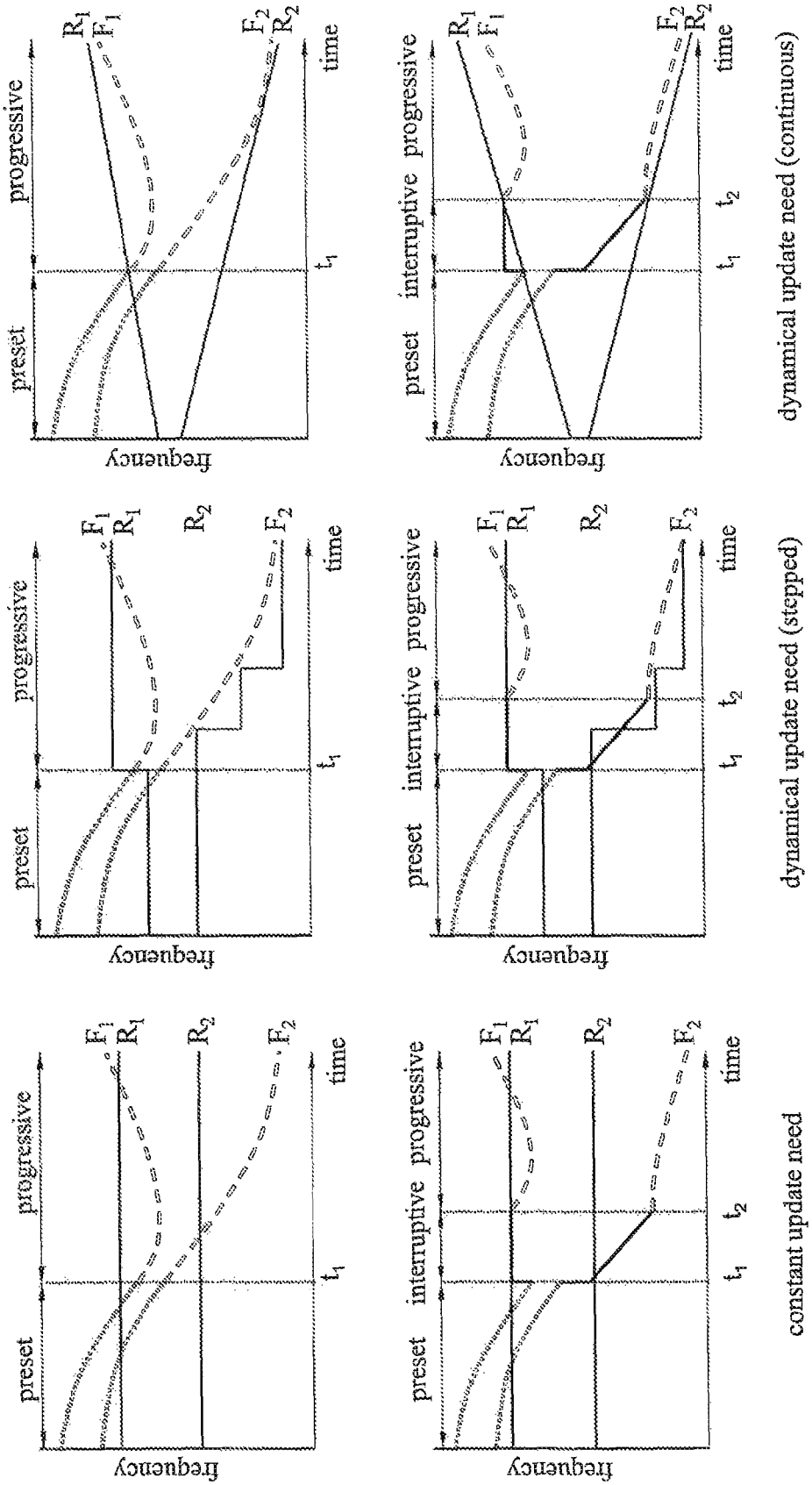
FIG. 7 illustrates a system of dynamically adjusting a generation frequency of messages in vehicular networks with respect to different update needs according to the present disclosure.

FIG. 7 illustrates a system of dynamically adjusting a generation frequency of messages in vehicular networks with respect to different update needs according to the present disclosure. The upper row presents transmissions from a default adjustment method to the progressive adjustment method, and the lower row presents transmissions from a default adjustment method to the interruptive adjustment method first, and subsequently adjusted to the progressive adjustment method. Update needs are categorized into three, that is, constant update need, stepped dynamic update need, and continuous dynamic update need.

The constant dynamic update need means that $R_1$ and $R_2$ (hereinafter referring to required frequencies) are constant, stepped dynamic update need means that $R_1$ and $R_2$ vary in a stepped way, and the continuous dynamic update need means that $R_1$ and $R_2$ vary in a linear way. In the progressive adjustment method, abovementioned three update needs have similar processes, that is, $F_1$ (hereinafter referring to current frequency of the first carrier) progressively increases and $F_2$ (hereinafter referring to current frequency of the second carrier) progressively reduces. In the interruptive adjustment method, both the constant update need and stepped dynamic update need immediately increase $F_1$ to $R_1$. With regard to the continuous update need, due to $R_1$ varies in a linear way, merely increasing $F_1$ to $R_1$ cannot satisfy the need at next time, so an increase larger than $R_1$ is generated to satisfy the need after a period of time.

Figure 8:
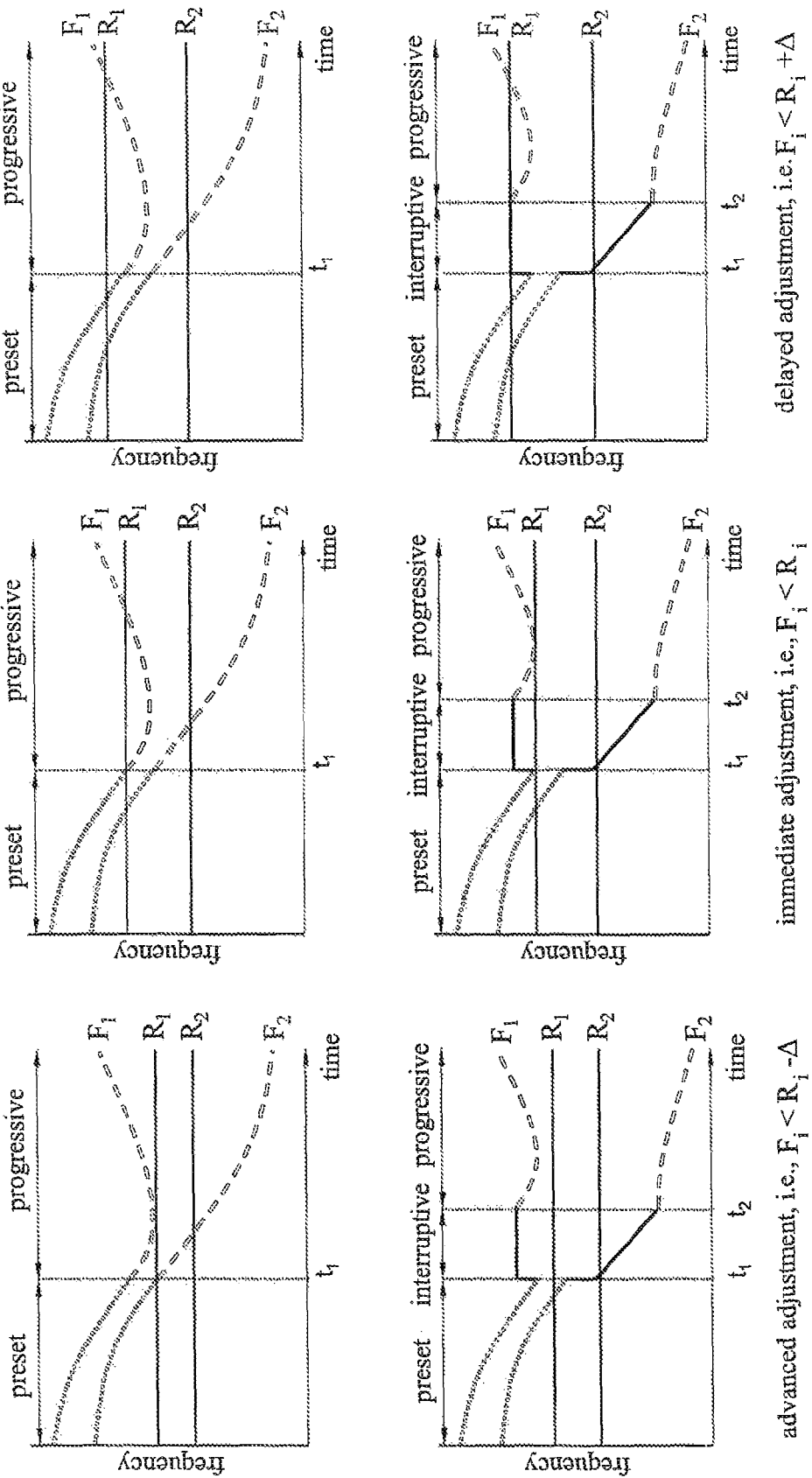
FIG. 8 illustrates a system of dynamically adjusting a generation frequency of messages in vehicular networks with respect to different adjustment timings according to the present disclosure.

FIG. 8 illustrates a system of dynamically adjusting a generation frequency of messages in vehicular networks with respect to different adjustment timings according to the present disclosure. The upper row presents transmissions from a default adjustment method to the progressive adjustment method, and the lower row presents transmissions from a default adjustment method to the interruptive adjustment method first, and subsequently adjusted to the progressive adjustment method. Adjustment times can also be categorized into three, that is, advanced adjustment, immediate adjustment, and delayed adjustment.

The advanced adjustment means that $F_1$ is adjusted when it is not less than $R_1$ yet, and thus the adjustment can be set to begin at a frequency difference $\Delta$. The immediate adjustment means that $F_1$ is adjusted when it is equal to $R_1$, for example, when $F_1$ is determined as getting lower and being equal to $R_1$ (subsequently may be less than $R_1$), $F_1$ is adjusted. The delayed adjustment means that $F_1$ is adjusted when it is less than $R_1$, similarly, the adjustment can be set to begin at a frequency difference $\Delta$. The delayed adjustment prevents the frequency adjustment from being too sensitive, that is, the adjustment is performed only when the need of adjusting frequency is confirmed.

Figure 9:
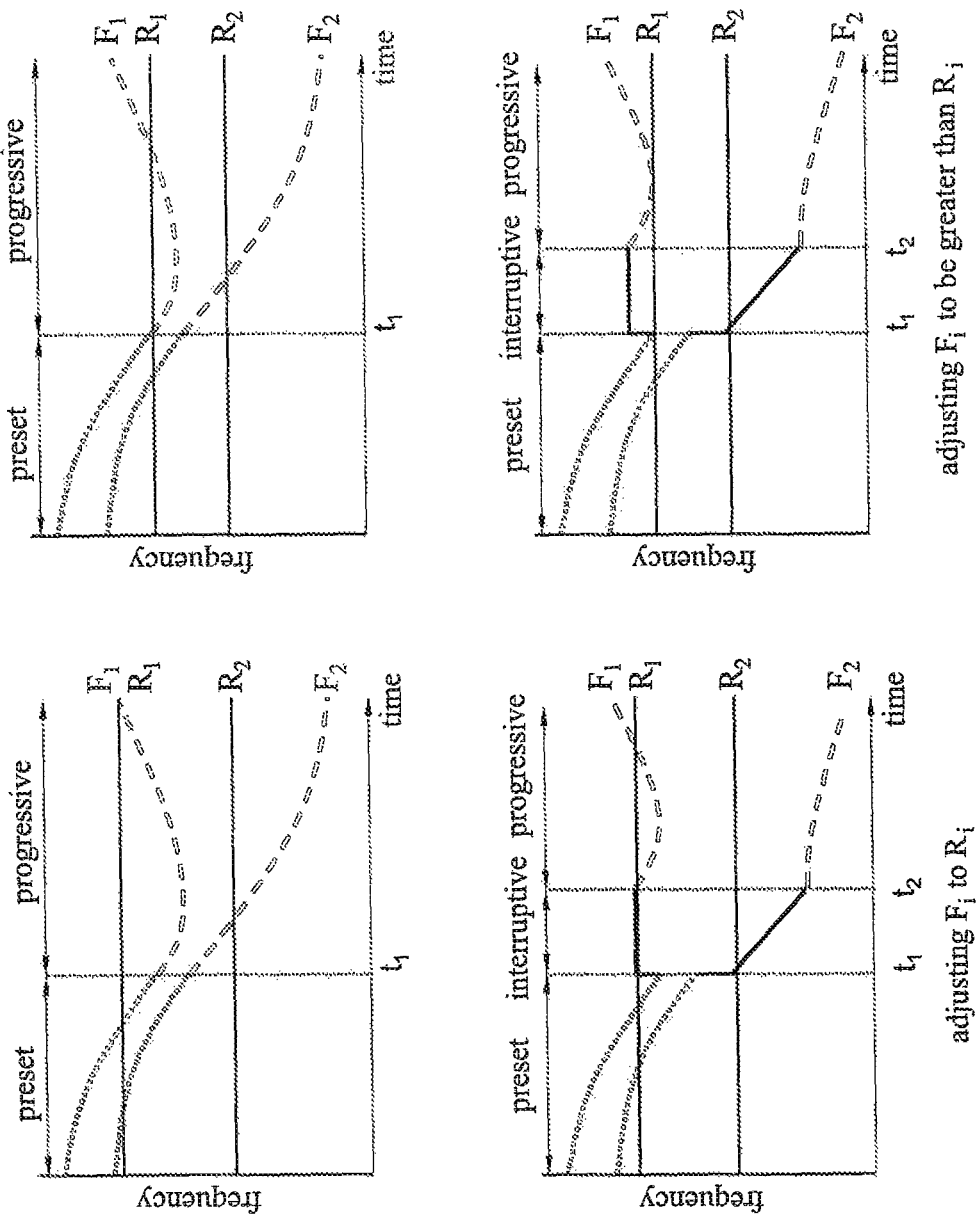
FIG. 9 illustrates a system of dynamically adjusting a generation frequency of messages in vehicular networks with respect to different adjustment degree according to the present disclosure.

FIG. 9 illustrates a system of dynamically adjusting a generation frequency of messages in vehicular networks with respect to different adjustment degree according to the present disclosure. The upper row presents transmissions from a default adjustment method to the progressive adjustment method, and the lower row presents transmissions from a default adjustment method to the interruptive adjustment method first, and subsequently adjusted to the progressive adjustment method. Adjustment magnitude is categorized in increasing to the required frequency and increasing to be above the required frequency.

The increasing to the required frequency means that $F_1$ is only increased to $R_1$, and the increasing to be above the required frequency means that $F_1$ is increased to be above $R_1$ for a possible need in the future.

FIGS. 7-9 illustrate possible conditions of different update needs, different adjustment times, and different adjustment magnitudes. This provides a designer to modify based on different needs while designing a frequency adjustment mechanism.

Figure 10:
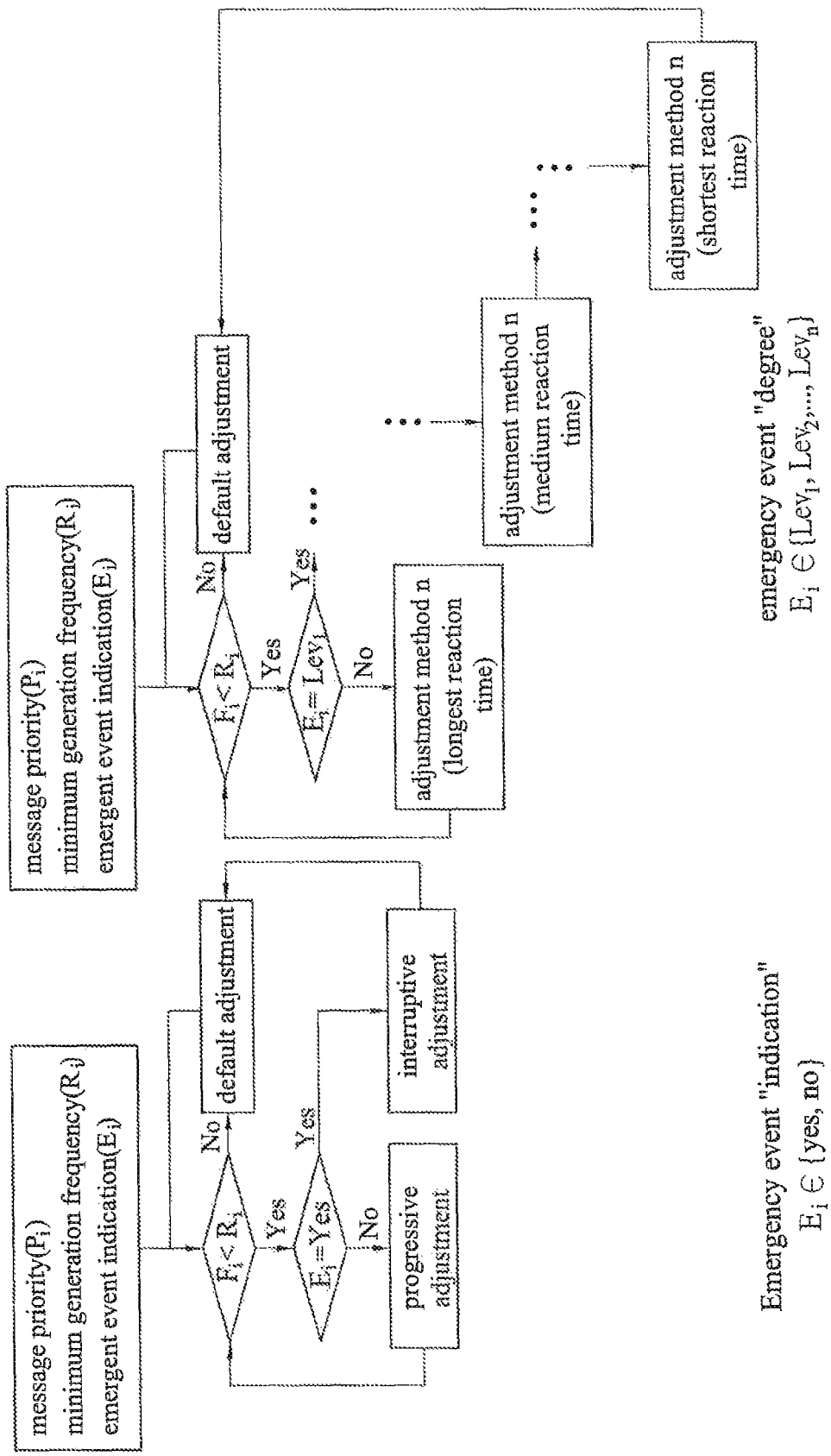
FIG. 10 illustrates a system of dynamically adjusting a generation frequency of messages in vehicular networks with respect to handling various emergent event according to the present disclosure.

FIG. 10 illustrates a system of dynamically adjusting a generation frequency of messages in vehicular networks with respect to handling various emergent event according to the present disclosure. The flow chart in the left portion of FIG. 10 explains that the indication indicates an emergent event or not an emergent event, that is, the indication is merely differentiated with emergent and non-emergent. Therefore, different situations correspond to the default adjustment, progressive adjustment, and interruptive adjustment.

Moreover, the flow chart in the right portion of FIG. 10 explains that the indication indicates emergent degrees of the emergent event, that is, the emergent event is differentiated with various degrees. Therefore, the default adjustment method is applied if there is no need to adjust, otherwise with different emergent degrees, different adjustment methods are provided based on the emergent degree. In other words, more emergent one handles shorter reaction time.

In comparison with the prior art, the system of dynamically adjusting generation frequency of messages in vehicular networks and method thereof proposed by the present disclosure determine whether the present generation frequency of messages of the carrier satisfies the event update need, and adjust the generation frequency of messages if the need is not satisfied. Subsequently, different adjustment speeds are provided based on the emergent degree. This is not considered in the prior art. Therefore, the determination criteria proposed in the present disclosure considers the carrier with respect to different needs, instead of merely considering the degree of priority and the channel state. Thus, lower-priority messages do not overly occupy the channel, meanwhile the needs of emergency messages with higher priority are immediately satisfied once occur, so as to transmit messages immediately.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system of dynamically adjusting a generation frequency of messages in vehicular networks arranged in a carrier, comprising:
a message receiver configured for receiving a message priority and a minimum update frequency of messages from an application and an event indication generated by the carrier when moving dynamically; and
a processor configured for
determining whether a generation frequency of messages of the carrier meets the minimum update frequency and generating a frequency adjustment instruction when the generation frequency does not meet the minimum update frequency;
determining whether the event indication is an emergent event after receiving the frequency adjustment instruction, and generating an interruptive adjustment instruction when the event indication is determined to be the emergent event, or a progressive adjustment instruction when the event indication is determined to be not the emergent event; and
adjusting the generation frequency based on the interruptive adjustment instruction or the progressive adjustment instruction, wherein the processor, based on the progressive adjustment instruction, reduces a generation frequency of messages of another carrier, detects a channel load of a message transmitting channel in the carrier, and adjusts the generation frequency based on the channel load, and wherein the processor, based on the interruptive adjustment instruction, adjusts the generation frequency to be no lower than the minimum update frequency, and reduces a generation frequency of messages of another carrier according to one or more channel access parameters which are set based on the message priority.

2. The system of claim 1, wherein the processor generates a default adjustment instruction when the generation frequency meets the minimum update frequency, and the processor adjusts the generation frequency according to the default adjustment instruction.

3. The system of claim 1, wherein the emergent event further comprises a plurality of emergent degrees, and the processor determines which one of the emergent degrees is corresponding to the event instruction and generates the interruptive adjustment instruction that corresponds to the one of the emergent degrees.

4. A method of dynamically adjusting a generation frequency of messages in vehicular networks, comprising:
receiving a message priority and a minimum update frequency of messages from an application and an event indication generated by a carrier when moving dynamically that uses the messages from the application;
determining whether a generation frequency of messages of the carrier meets the minimum update frequency, and generating a frequency adjustment instruction when the generation frequency does not meet the minimum update frequency;
determining whether the event indication is an emergent event after receiving the frequency adjustment instruction, and generating an interruptive adjustment instruction when the event indication is determined to be an emergent event, or a progressive adjustment instruction when the event indication is determined to be not the emergent event; and
executing the interruptive adjustment instruction or the progressive adjustment instruction to adjust the generation frequency,
wherein when the progressive adjustment instruction is executed, a generation frequency of messages of another carrier is reduced, a channel load of a message transmitting channel in the carrier is detected, and the generation frequency is adjusted based on the channel load, and
wherein when the interruptive adjustment instruction is executed, the generation frequency is adjusted to be no lower than the minimum update frequency, and a generation frequency of messages of another carrier is reduced according to one or more channel access parameters which are set based on the message priority.

5. The method of claim 4, wherein determining whether a generation frequency of messages of the carrier meets the minimum update frequency includes generating a default adjustment instruction when the generation frequency meets the minimum update frequency, and the generation frequency is adjusted according to the default adjustment instruction.

6. The method of claim 4, wherein the emergent event further comprises a plurality of emergent degrees, one of which is corresponding to the event indication, and the interruptive adjustment instruction is corresponding to one of the emergent degrees.

* * * * *